United States Patent
Hommen et al.

(10) Patent No.: US 7,243,606 B2
(45) Date of Patent: Jul. 17, 2007

(54) SYSTEM FOR THE SECONDARY SUSPENSION OF A SUPERSTRUCTURE OF A RAIL VEHICLE HAVING AN ACTIVE SPRING ELEMENT

(75) Inventors: Winfried Hommen, Ebersberg (DE); Henry Kirsch, München (DE); Eduard Nies, Puchheim (DE); Martin Waldstein, München (DE); Reinhard Loebner, München (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 152 days.

(21) Appl. No.: 11/015,799

(22) Filed: Dec. 20, 2004

(65) Prior Publication Data

US 2005/0183627 A1 Aug. 25, 2005

(30) Foreign Application Priority Data

Dec. 22, 2003 (DE) ................. 103 60 516

(51) Int. Cl.
*B61F 1/00* (2006.01)
(52) U.S. Cl. ..................................... 105/453
(58) Field of Classification Search ................ 105/453, 105/199.1, 199.2, 199.3
See application file for complete search history.

(56) References Cited

U.S. PATENT DOCUMENTS

| | | | |
|---|---|---|---|
| 2,917,321 A | 12/1959 | Fennell | |
| 3,396,674 A | 8/1968 | Tani | |
| 3,491,702 A | 1/1970 | Dean | |
| 3,524,657 A | 8/1970 | Yew et al. | |
| 4,097,063 A | 6/1978 | Dean | |
| 4,368,672 A | 1/1983 | Germer | |
| 4,428,302 A | 1/1984 | Herring, Jr. | |
| 4,468,050 A | 8/1984 | Woods et al. | |
| 5,193,849 A | 3/1993 | Holzmann | |
| 5,443,282 A | 8/1995 | Gipser | |
| 5,573,266 A | 11/1996 | Zalewski et al. | |
| 5,588,368 A * | 12/1996 | Richter et al. | ........... 105/199.1 |
| 5,671,682 A | 9/1997 | Hölzl et al. | |
| 5,700,026 A | 12/1997 | Zalewski et al. | |
| 5,769,400 A | 6/1998 | Hölzl et al. | |
| 5,947,031 A | 9/1999 | Polley | |
| 5,988,655 A | 11/1999 | Sakai et al. | |
| 6,098,995 A | 8/2000 | Danis | |
| 6,102,378 A | 8/2000 | Gieseler et al. | |
| 6,249,728 B1 | 6/2001 | Streiter | |
| 6,273,002 B1 | 8/2001 | Hachmann et al. | |
| 6,550,394 B1 | 4/2003 | Polley | |
| 6,623,016 B2 | 9/2003 | Sulzyc et al. | |
| 6,637,348 B1 | 10/2003 | Teichmann et al. | |
| 6,684,139 B1 | 1/2004 | Kirat et al. | |
| 2002/0096840 A1 | 7/2002 | Sulzyc et al. | |

FOREIGN PATENT DOCUMENTS

AT 373 847 7/1983

(Continued)

*Primary Examiner*—S. Joseph Morano
*Assistant Examiner*—Robert J. McCarry, Jr.
(74) *Attorney, Agent, or Firm*—Barnes & Thornburg LLP (57) ABSTRACT

A secondary suspension system for a rail vehicle includes a superstructure, a bogie arranged below the superstructure, a hydropneumatic spring unit located between the superstructure and the bogie, and at least one emergency spring cylinder.

22 Claims, 5 Drawing Sheets

FOREIGN PATENT DOCUMENTS

| | | |
|---|---|---|
| DE | 1 947 680 | 1/1971 |
| DE | 27 23 305 | 12/1978 |
| DE | 38 34 693 A1 | 6/1989 |
| DE | 40 13 673 A1 | 10/1991 |
| DE | 195 15 255 A1 | 10/1996 |
| EP | 0 663 877 B1 | 7/1995 |
| EP | 0 690 802 B1 | 1/1996 |
| FR | 2 436 682 | 9/1978 |
| WO | WO 94/03340 A1 | 2/1994 |

* cited by examiner

SYSTEM FOR THE SECONDARY SUSPENSION OF A SUPERSTRUCTURE OF A RAIL VEHICLE HAVING AN ACTIVE SPRING ELEMENT

BACKGROUND AND SUMMARY

The present disclosure relates to a system for the secondary suspension of a superstructure or a rail vehicle. The system includes a hydropneumatic spring unit as an active spring element which is placed between the superstructure and a bogie arranged below it and which ensures at least one raised traveling level $N_F$ for the superstructure when the rail vehicle is traveling.

In addition to the secondary suspension being used for the increase of comfort in the conveyance of passengers, a rail vehicle normally also has a primary suspension. The primary suspension acts between the wheel axles of the rail vehicle and the bogie and is used predominantly for absorbing hard shocks to which the rail vehicle is subjected during its travel as a result of an uneven rail guidance and the like. In contrast, a secondary suspension between a superstructure and railborne bogie of a rail vehicle is used for the additional vibration isolation of the superstructure in order to permit a particularly comfortable travel of the rail vehicle when conveying passengers. In many cases, the secondary suspension also interacts with a roll control for the superstructure.

From European Patent Document EP 0 690 802 B1, a secondary suspension for a rail vehicle is known which is constructed in the manner of a hydropneumatic suspension. The secondary suspension is achieved by a hydraulic cylinder whose pressure chamber is connected with a hydropneumatic pressure accumulator. By the gas volume of the hydropneumatic pressure accumulator, a vertical spring effect is achieved. Furthermore, the hydraulic cylinder is equipped with a pendulum support which forms a part of a piston rod which having a joint at an upper end. During transverse movements, the pendulum support swings out, its end rolling on a corresponding surface. Since the radius of the end surface of the pendulum support is larger than the distance of the joint from its supporting surface, a restoring moment takes place during transverse movements which, as a result of the constant distance of the joint from the supporting surface, is independent of the spring excursion.

It is generally known to use conventional steel springs for the secondary suspension in the simplest case, in addition to a pneumatic suspension or hydropneumatic suspension. The superstructure is normally cushioned with respect to the bogie by two passive spring elements, in which case the bogie normally carries a pair of wheel axles which establish the contact with the rail.

However, when a secondary suspension is constructed by steel springs as passive spring elements, the problem arises that the superstructure level may change as a function of the loading. In the present disclosure, the superstructure level is the vertical level of the superstructure relative to the bogie or to the ground.

From European Patent Document EP 0 663 877 B1, a system for the secondary suspension is known which avoids the above-noted problem in that no steel springs are used for the secondary suspension. The secondary suspension is implemented by a hydropneumatic spring unit. The hydropneumatic spring unit consists of a spring leg and of a hydropneumatic pressure accumulator. These assemblies carry out the function of cushioning the superstructure as well as the function of damping the spring excursions. The spring leg is fastened on the superstructure and on the bogie. During a spring excursion, the piston in the spring leg displaces a defined oil volume. In the hydropneumatic pressure accumulator connected with the spring leg, this oil volume acts against a gas cushion which is separated from the oil volume by a membrane and is therefore used as a springy element. The hydraulic fluid, as the liquid column, therefore takes over the function of the power transmission. Vehicle vibrations during the travel are damped by the nozzles housed in a nozzle block. As the load of the superstructure increases, the gas volume in the hydropneumatic accumulators is compressed. Without any level control system, this would result in a lowering of the superstructure, as in the case of the above-described passive spring element. However, in order to avoid this lowering, the reduction of the gas volume has to be compensated by feeding a corresponding amount of hydraulic fluid. For this purpose, the level control system is provided which carries out this compensation as a function of the distance between the superstructure and the bogie measured by a level sensor. The controlling of level changes takes place continuously and with little time delay while the vehicle is stopped. During the travel, the mean vehicle level is also continuously monitored and compensated.

In certain application cases, it is defined that, in addition to a raised traveling level $N_F$, the superstructure also has to take up a station platform level $N_B$ which is below it and which, in a lowered position of the superstructure matches the door steps of the rail vehicles with the height of the station platform, so that an entering and exiting becomes possible without steps. Furthermore, it has to be provided that, despite such a lowered station platform level $N_B$, in the case of a system failure in the station, the superstructure of the rail vehicle, while being operated independently and manually, can also be brought to an emergency level $N_N$ situated above the platform level, for resuming the travel. Furthermore, it is to be provided that, in the event of a system failure, the superstructure of the rail vehicle, during the travel, is not lowered from the raised traveling level $N_F$ to below the emergency level $N_N$.

Despite the system failure, this emergency level $N_N$ situated between the lowered station platform level $N_B$ and the raised traveling level $N_F$ permits an at least slow continued traveling of the rail vehicle.

In the case of the known system for the secondary suspension with an active level control system, an emergency level $N_N$, starting from a traveling level $N_F$, however, can be adjusted only if sufficient storage pressure is still present in the storage accumulator and the assigned valve is operated manually. Thus, an emergency level $N_N$ does not have to be ensured under all circumstances.

The present disclosure provides a system for the secondary suspension by which, despite a system failure, under all conditions, the superstructure, when stopped, can take up an emergency level $N_N$ from a lowered station platform level $N_B$ and, in the event of system failure during travel, the superstructure is not lowered below the emergency level $N_N$ from the raised traveling level $N_F$.

Thus, according to the present disclosure, a secondary suspension system for a rail vehicle includes a superstructure and a bogie arranged below the superstructure. Also included is a hydropneumatic spring unit located between the superstructure and the bogie. The hydropneumatic spring unit provides, in a normal operation, at least one raised traveling level for the superstructure and a lowered platform level for the superstructure that is lower than the at least one raised traveling level. Further included is at least one emergency spring cylinder, wherein when the system fails, the at least one emergency spring cylinder provides an emergency spring level situated between the at least one raised traveling level and the lowered platform level.

The present disclosure includes the technical teaching that, by a hydropneumatic spring unit being used as an active spring element in the normal operation, in addition to the raised traveling level $N_F$, a lowered station platform level $N_B$ can be adjusted for the superstructure. Additionally, at least one emergency spring cylinder is provided which, when the system fails, ensures an emergency operation by an emergency spring level $N_N$ situated in-between the traveling level $N_F$ and the lowered platform level $N_B$. On the one hand, the emergency spring level $N_N$, in the event of a system failure, can be adjusted by an automatic moving-out of the emergency spring cylinder. On the other hand, it is also conceivable, as an alternative, that the emergency spring level $N_N$ occurs in the event of a system failure by the already moved-out emergency spring cylinder which therefore is already in readiness.

According to the present disclosure, having an active secondary suspension with respect to the flexible adjustment of different superstructure levels connected with a passively functioning emergency operation permits at least a slow continued traveling of the rail vehicle. In principle, the emergency suspension is automatically activated when the system pressure decreases. During the stoppage times, that is, in the area of the station stop, this has the effect that the superstructure can reach a higher emergency spring level $N_N$ from the lower station platform level $N_B$.

According to a an embodiment of the present disclosure, the emergency spring cylinder includes a hydraulic tension cylinder and a piston, and the tension cylinder can be moved out by a pressure spring. The force exercised by the pressure spring in the tensioned condition upon the tension cylinder is stored by a rearward admission of pressure medium to the tension cylinder. When this rearward pressure decreases, the piston or the tension cylinder carries out the move-out motion as a result of the now predominant spring force.

A space-saving arrangement may be achieved in that the pressure spring is produced of steel in the manner of a coil spring which coaxially surrounds the tension cylinder. As a result of this arrangement of the pressure spring, which is exposed to the outside, the applicable spring force can be maximized because of the large diameter. Simultaneously, the components of the tension cylinder, which can be moved relative to one another, are protected by the pressure spring surrounding them.

With respect to the flow of force, the emergency spring cylinder can be connected in parallel or in series to the hydropneumatic spring unit.

In the case of a parallel connection, the emergency spring cylinder can be arranged to be acting locally next to the hydropneumatic spring unit between the superstructure and the bogie. The side-by-side arrangement, in the case of existing secondary suspensions with a hydropneumatic spring unit as an active spring element, may allow a retrofitting to take place in a simple manner by adding the emergency spring cylinder in order to permit an emergency operation or the concerned rail vehicles.

As an alternative, it is also conceivable to have an embodiment configured such that the emergency spring cylinder coaxially surrounds the hydropneumatic spring unit and is disengaged in the normal operation, with the emergency spring cylinder being used in the emergency operation. This embodiment of a parallel connection represents a space-saving solution because little space is required for installing the secondary suspension, according to the present disclosure. Also, in the emergency operation, parts of the hydropneumatic spring unit continue to participate in the power transmission. That is, they do not remain completely unutilized.

In addition, for the just-noted embodiment, for the emergency operation, the hydropneumatic spring unit is vertically guided by a coaxial upper pin via a corresponding recess on a side of the superstructure. It is also conceivable to arrange the guiding elements in a reverse manner, so that a pin is arranged on a side of the undercarriage, which pin is vertically guided in a corresponding recess on a side of the hydropneumatic spring unit or the like.

A series connection of the emergency spring cylinder and the hydropneumatic spring unit according to the flow of force is possible, in that both units are arranged behind one another in the flow of force and therefore act simultaneously. For reaching the lowered station platform level $N_B$ for the superstructure, an additional action upon the tension cylinder takes place in order to compress the pressure spring. In this embodiment, a difference is made in the normal operation between the operation when traveling and the operation when stopped, that is, at the station platform. During travel, the hydropneumatic spring unit acts in series with the steel spring of the tension cylinder; that is, the tension cylinder is pressureless and the steel spring can oscillate. In contrast, at the station platform, the steel spring is compressed by the action upon the tension cylinder in order to implement a lowering of the rail vehicle to the station platform level $N_B$. If the hydropneumatic spring unit fails (system failure), the steel spring takes over the secondary suspension. The flow of force is created by the direct contact of the piston and the cylinder of the hydropneumatic spring unit in the end stop position, whereby the spring rigidity is also increased in the case of a corresponding design. The transverse suspension is maintained as a result of the series arrangement. In contrast to the above-described embodiments, here the steel spring of the emergency suspension is always positioned correctly, so that there are no take-over problems with respect to the latter.

The automatic moving-out of the piston of the emergency spring cylinder takes place as a result of a pressure drop. As an alternative, it is also conceivable that, in the normal operation, the piston of the emergency spring cylinder remains moved-out while being disengaged. The hydropneumatic spring unit ensures the traveling level $N_F$, and that, after an activating of unlocking devices, the piston can at least partially be lowered inside a pot-shaped cylinder housing surrounding it. This has the effect that also the lowered station platform level $N_B$ can be reached. In the event of a system failure during the travel, the normally closed unlocking devices ensure the moved-out position of the piston of the emergency spring cylinder so that the emergency level $N_N$ is ensured by way of the emergency spring cylinder. In the event of a system failure in the station, that is, during a stoppage, pressure has to be applied by way of another circuit. This can be achieved by a manual operation or by the pressure medium stored in an additional storage device.

In the first-described embodiment, the piston of the emergency spring cylinder should include at least one piston sleeve telescopically displaceable against a spring force into the piston in order to ensure the spring deflection along the required spring travel. A high spring force can be generated in that an elastomer element is coaxially surrounded by a coil spring made of spring steel. In this embodiment, high spring forces can be implemented for a secondary suspension so that a multiple arrangement of emergency spring cylinders for the secondary suspension for ensuring the emergency operation can possibly be avoided.

It may also be conceivable to completely eliminate the hydropneumatic spring unit in this embodiment. The reason is that the emergency spring cylinder of this embodiment can also be used directly for the level control by the admission of pressure medium to a pressure chamber. This will then be a type of vertically adjustable emergency spring which is locked in the moved-out position of the piston and to this extent takes over the function of the secondary spring in the normal operation as well as of the emergency spring in the emergency operation.

The system according to the present disclosure for the secondary suspension includes a hydropneumatic spring unit as well as an emergency spring cylinder which can be acted upon by a pressure medium. The system can be operated by a single hydraulic circuit or by two separate hydraulic circuits. In the case of a single hydraulic circuit, the hydropneumatic spring unit as well as the emergency spring cylinder can be supplied with pressure medium therefrom. However, the minimal dynamic pressure in a hydraulic accumulator should be sufficiently dimensioned such that the pressure spring of the emergency spring cylinder can be kept in the compressed condition. In contrast, in the case of two hydraulic circuits, one hydraulic circuit is assigned to the hydropneumatic spring unit, and the other hydraulic circuit is assigned to the emergency spring cylinder. The two hydraulic circuits allow for different operating pressures to be a provided for the two circuits, which results in freedom with respect to the design and dimensioning of the pressure medium aggregates.

The hydropneumatic spring unit may comprise a pendulum support so that transverse movements between the superstructure and the bogie are permitted and restoring forces are applied for centering the superstructure.

In order to implement an active level control between the raised traveling level $N_F$ and the lowered station platform level $N_B$, a level sensor is provided for measuring the actual distance between the superstructure and the bogie. The level sensor operates as an actual value generator and transmits the electrical measuring signals to an electronic control unit comprising a regulating unit which generates corresponding adjusting signals for the valve control of the hydraulic circuits based on defined desired values, so that the desired superstructure level can be adjusted. This normally takes place via the hydropneumatic spring unit.

Other aspects of the present disclosure will become apparent from the following descriptions when considered in conjunction with the accompanying drawings.

DETAILED DESCRIPTION

Figure 1:
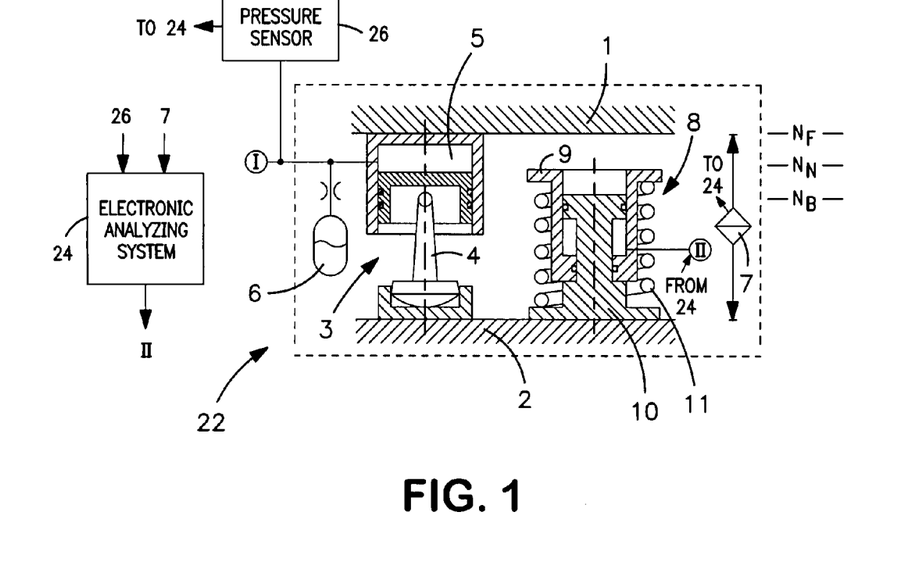
FIG. 1 is a sectional view of an embodiment of a system for the secondary suspension of a superstructure with an emergency spring cylinder arranged locally next to an hydropneumatic spring unit, during a travel operation, according to the present disclosure.

In view of FIG. 1, a hydropneumatic spring unit 3, as an active spring element, is arranged between a top superstructure 1 of a rail vehicle partially shown, and a lower bogie 2. When the rail vehicle is traveling for example, in a normal operation, the hydropneumatic spring unit 3 ensures a raised traveling level $N_F$ for the superstructure 1, so that the latter remains largely unaffected by disturbing vibrations caused by the travel. By a lower pendulum support 4, the hydropneumatic spring unit 3 simultaneously also takes over or serves as a transverse guidance of the superstructure 1. A pressure chamber 5 of the hydropneumatic spring unit 3 is acted upon by a hydraulic circuit 1. A hydraulic accumulator 6 is connected parallel thereto an integrated gas volume of the hydraulic accumulator 6 ensuring the spring characteristic of the hydropneumatic spring unit 3. As a result of action upon the pressure chamber 5, the distance between the superstructure 1 and the bogie 2 can be varied. For regulating this superstructure level, a level sensor 7 is provided for measuring the distance between the superstructure 1 and the bogie 2. The level sensor operates as an actual value generator of an active level control system 22 integrated in an electronic control unit 24 (See FIG. 1) for adjusting the desired superstructure level.

The superstructure 1 is raised to an upper traveling level $N_F$ during the normal travel of the rail vehicle. In this position, a maximal spring excursion is ensured for maximum comfort. While the rail vehicle stops at a station platform, the superstructure 1 is lowered to a lower station platform level $N_B$. At this station platform level $N_B$, the passengers of the rail vehicle can comfortably walk onto a relatively lower station platform without having to walk over a step.

In addition to the hydropneumatic spring unit 3, an emergency spring cylinder 8 is provided locally next to it. The emergency spring cylinder 8 becomes active only in the event of a system failure, that is, when there is a falling below a minimum pressure in the hydraulic circuit I. That ensures an emergency operation for the rail vehicle as a result of an automatic moving-out of a piston or an hydraulic tension cylinder 9 of emergency spring cylinder 8. During this emergency operation, the rail vehicle can still be moved at least at a low speed. In the emergency operation, an emergency spring level $N_N$ is held by the emergency spring cylinder 8, which emergency spring level $N_N$ is situated between the raised traveling level $N_F$ and the lowered station platform level $N_B$.

In an embodiment, according to the present disclosure, the emergency spring cylinder 8 includes piston 10 and the hydraulic tension cylinder 9, which tension cylinder 9 can be moved out by a pressure spring 11. The pressure spring 11 may be, for example, constructed of steel in the manner of a coil spring and coaxially surrounds the tension cylinder 9.

Thus, with respect to a flow of force, the emergency spring cylinder 8 is situated or switched parallel to the hydropneumatic spring unit 3. As shown in FIG. 1, the secondary suspension is in the normal operation during travel. The tension cylinder 9 is acted upon by pressure for hydraulic circuit II, so that the pressure spring 11 is compressed and, at this point, the emergency spring cylinder 8 does not become operative.

Figure 1A:
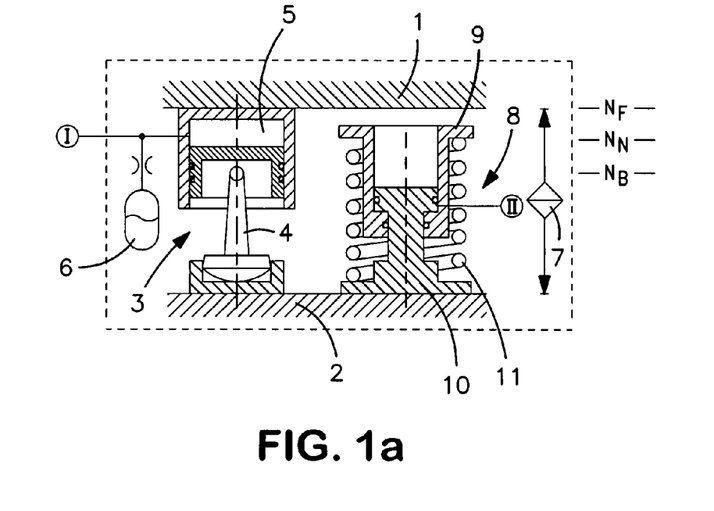
FIG. 1a is a view of the system according to FIG. 1 with a tension cylinder moved out into a readiness position.

In a modification according to FIG 1*a*, it is provided that, in the event of a system failure, the emergency spring level $N_N$ is adjusted by way of an already moved-out emergency spring cylinder 8.

Figure 2:
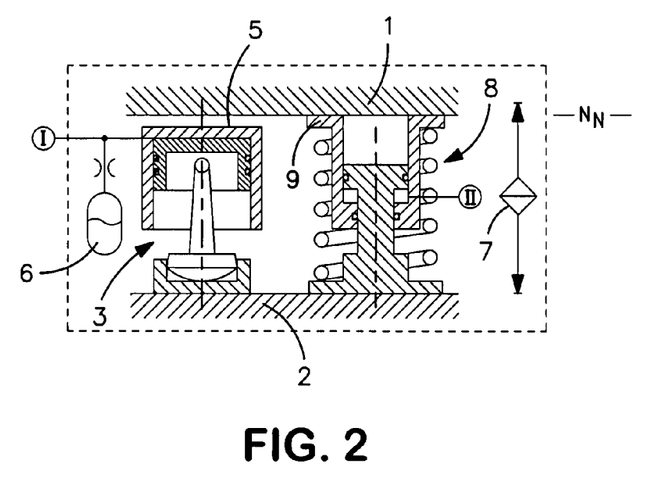
FIG. 2 is a sectional view of the system according to FIG. 1 during an emergency operation.

According to FIG. 2, a system failure results in a pressure drop in the hydraulic circuits I and II so that, on the one hand, the hydropneumatic spring unit 3 can no longer carry out its function of a secondary suspension. On the other hand, as a result of the pressure drop in the tension cylinder 9, an automatic moving-out of the tension cylinder 9 takes place which now comes in contact with the superstructure 1 and takes over as the secondary suspension in an emergency operation.

Figure 3:
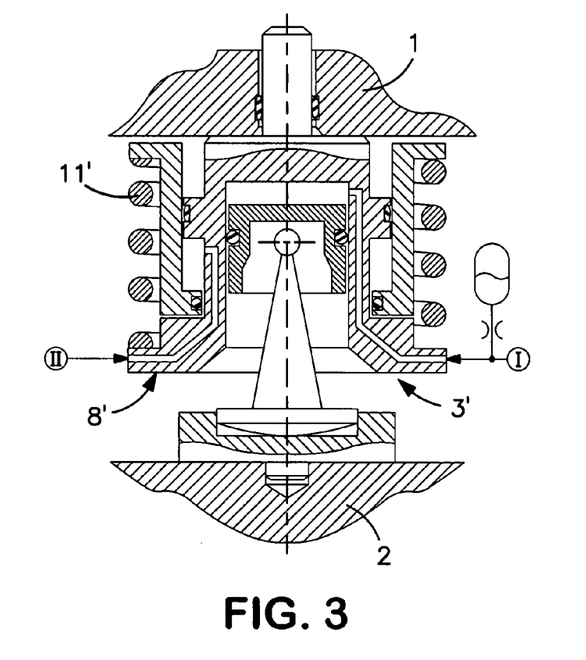
FIG. 3 is a sectional view of another embodiment of a system for the secondary suspension of a superstructure with a coaxial arrangement of the hydropneumatic spring unit and the emergency spring cylinder, during a travel operation, according to the present disclosure.

In another embodiment according to FIG. 3, the emergency cylinder 8' surrounds the hydropneumatic spring unit 3', so that a construction is obtained which is compact as a whole. In the illustrated position in the normal operation, that is, during travel, the pressure spring 11' is tensioned as a result of the admission of pressure medium by the hydraulic circuit II and is therefore not in contact with the superstructure 1. The vertical adjustment of the superstructure level takes place via the hydraulic circuit I in conjunction with the hydraulic accumulator 6', as described with respect to the above-mentioned embodiment.

Figure 4:
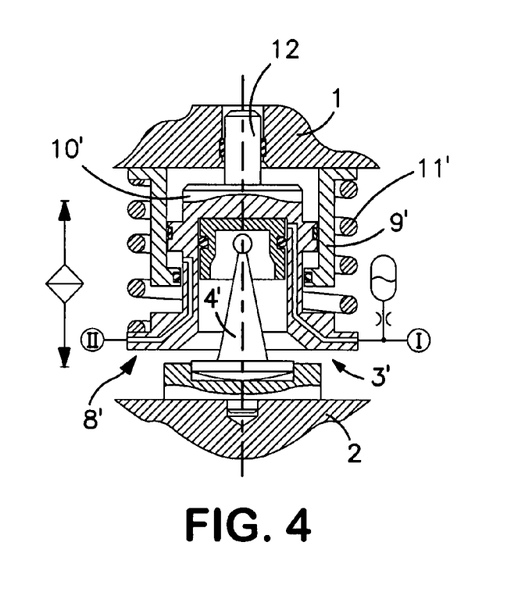
FIG. 4 is a sectional view of the system according to FIG. 3 during an emergency operation.

In the emergency operation, according to FIG. 4, the tension cylinder 9' of the emergency spring cylinder 8' comes to rest on the superstructure 1 because the hydraulic circuits I and II lose pressure. As a result, the pressure spring 11' relaxes and now takes over as the secondary suspension in the emergency operation. For guiding the hydropneumatic spring unit 3' in the emergency operation, the hydropneumatic spring unit 3' is equipped with an upper pin 12 which is vertically guided inside a corresponding recess on a side of the superstructure 1. Because of the arrangement of the hydropneumatic spring unit 3' and the emergency spring cylinder 8', which is concentric here, the transverse suspension and a supporting by the pendulum support 4' are maintained.

Figure 5:
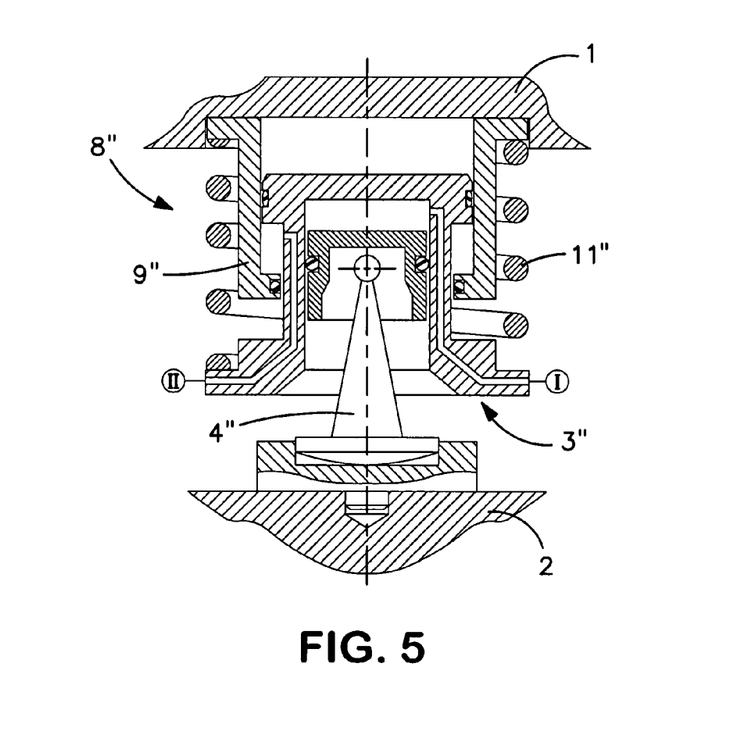
FIG. 5 is a sectional view of another embodiment of a system for the secondary suspension of a superstructure in a series connection of the hydropneumatic spring unit and the emergency spring cylinder, during a travel operation, according to the present disclosure.

The embodiment according to FIG. 5 represents a flow-of-force-related series connection between the emergency spring cylinder 8" and the hydropneumatic spring unit 3", which are also arranged concentrically with respect to one another. In the normal operation as well as in the emergency operation, the hydropneumatic spring unit 3" and the emergency spring cylinder 8" operate simultaneously here in the flow of force between the superstructure 1 and the bogie 2. For reaching the lowered station platform level $N_B$ for the superstructure 1, an action upon the tension cylinder 9" by the hydraulic circuit II takes place which is additional with respect to the normal operation, in order to compress the pressure spring 11". When the hydropneumatic spring unit 3" fails in the emergency operation, the now moved-out tension cylinder 9 takes over as the secondary suspension. Also here, transverse suspension is maintained as a result of the pendulum support 4" being integrated in the flow of force. In the normal operation, the raised traveling level $N_F$ as well as the lowered station platform level $N_B$ are regulated via the hydraulic circuit I as described above.

Figure 6:
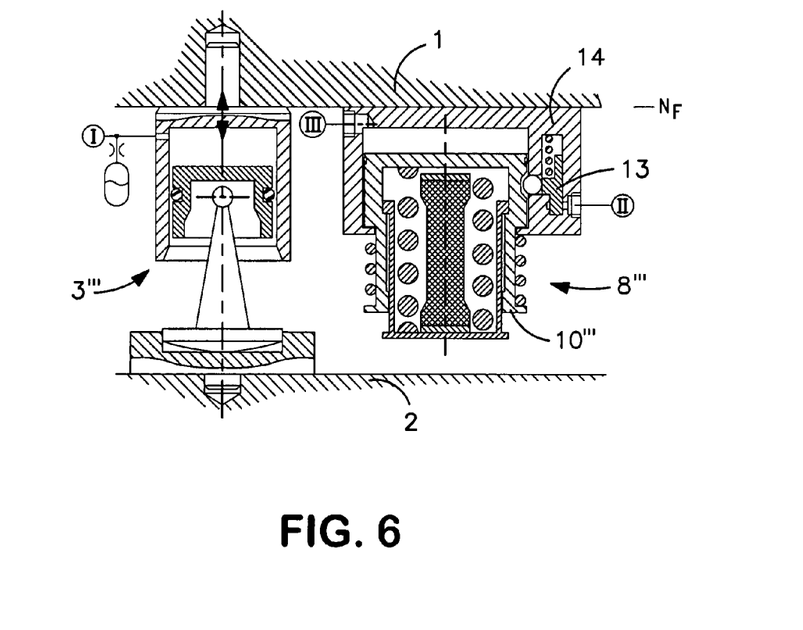
FIG. 6 is a sectional view of another embodiment of a secondary suspension for a superstructure with a hydropneumatic spring unit and a lockable emergency spring cylinder, during a travel operation, in accordance with the present disclosure.

In another embodiment according to FIG. 6, in the shown normal operation, an emergency spring cylinder 8''' arranged next to the hydropneumatic spring unit 3''' is disengaged. However the piston 10''' of this emergency spring cylinder 8''' has fully moved out. The hydropneumatic spring unit 3''' ensures the raised traveling level $N_F$ as well as the lowered station platform level $N_B$.

Figure 7:
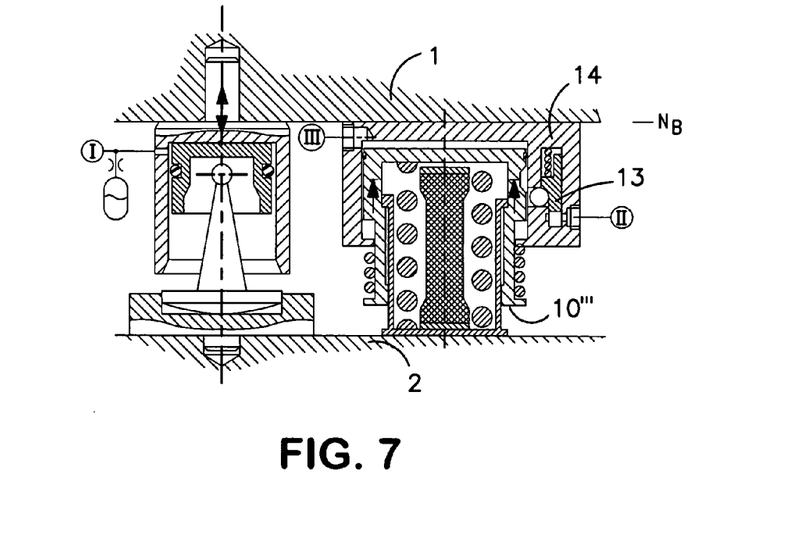
FIG. 7 is a sectional view of the system according to FIG. 6 during a stop at a station platform.

For taking up the lowered station platform level $N_B$, the piston 10''' can be lowered inside a pot-shaped cylinder housing 14, as illustrated in FIG. 7, after the activating of unlocking devices 13 which are constructed here in the manner of a lockball mechanism.

Figure 8:
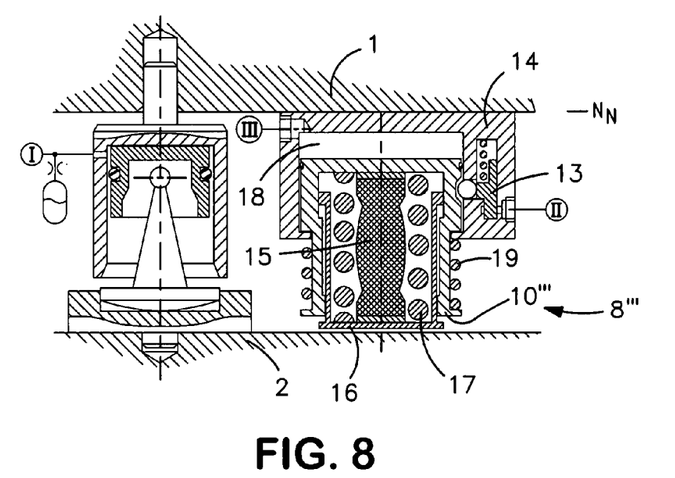
FIG. 8 is a sectional view of the system according to FIG. 6 during an emergency operation.

In the event of a system failure, thus, in the emergency operation, the normally closed unlocking devices 13, which can be unlocked by hydraulic circuit II, ensure the moved-out position of the piston 10''', as illustrated in FIG. 8. The secondary suspension is now ensured by a spring arrangement integrated in the piston 10''', which spring arrangement is formed of an elastomer element 15 as well as of a pressure spring 17 in the manner of a coil spring surrounding the elastomer element 15. A spring effect is achieved by a piston sleeve 16 which can be moved in and out relative to the pitons 10''' corresponding to the spring travel and comes to rest on the lower bogie 2. The piston 10''' can be changed into the moved-out position by a pressure spring 19 interacting with the pot-shaped cylinder housing 14, by weight as well as additionally by admitting pressure medium into pressure chamber 18 constructed in the cylinder housing 14, in which moved-out position, the emergency spring cylinder 8''' is locked in its moved-out position.

Figure 9:
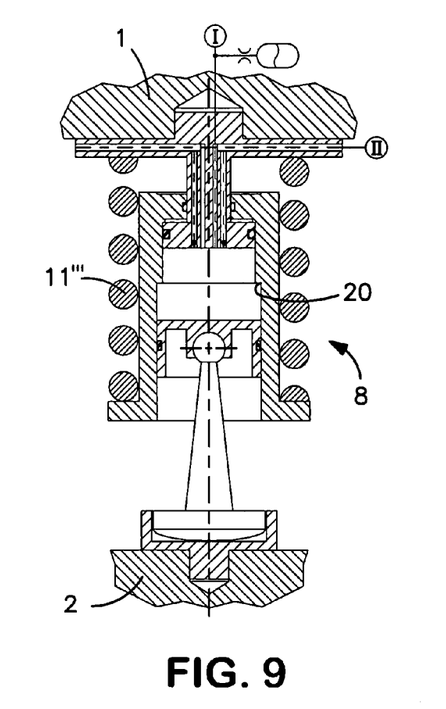
FIG. 9 is a sectional view of another embodiment of a system for the secondary suspension of a superstructure with a coaxially integrated variant of the embodiment of FIG. 1, during a stop at a station platform, in accordance with the present disclosure.

The embodiment according to FIG. 9 represents a coaxially integrated variant of the embodiment according to FIG. 1. The system is shown in the normal operation at a stop (or station platform) level $N_B$. For lowering the superstructure 1 to the station platform level $N_B$, circuit II is acted upon by compressed air, so that pressure spring 11''' is compressed which acts as an emergency spring. Simultaneously, oil in the hydropneumatic circuit I is discharged in order to lower the superstructure 1. After the loading of the superstructure 1 at the station stop has been concluded, oil is admitted to circuit I and the pressure in circuit II is lowered, so that the superstructure 1 rises to the traveling level $N_F$. The fixed stop 20 formed by a step in the interior of emergency spring cylinder 8 is now ready to take over the emergency spring function. Specifically, if the hydropneumatic circuit I fails, the superstructure 1 is lowered onto the stop 20, so that the pressure spring 11''' takes over as the secondary suspension.

In the normal operation during travel, the circuit II is pressureless. The secondary suspension takes place via the hydropneumatic circuit I. Depending on the adjustment of pressures, the secondary suspension can be achieved such that the pressure spring 11''' stands still or participates in the secondary suspension in the normal operation.

The present disclosure is not limited to the above-described embodiments. Thus, it is also conceivable to use also a single hydraulic circuit besides a separate admission of pressure medium to the hydropneumatic spring unit and the emergency spring cylinder by separate hydraulic circuits. However, in that case, value wiring would have to be correspondingly adapted. For ensuring a transition from the normal operation to the emergency operation that is as smooth as possible, the solution according to the present disclosure provides that the pressure control of the hydraulic circuit II is analyzed by the level detection of the sensor or the analysis of pressure gradient courses and is controlled correspondingly with respect to time.

The secondary suspension system further includes at least one hydraulic circuit, shown as hydraulic circuit I in FIG. 1, having a pressure sensor 26 and an electronic analyzing system 24 connected on an output side of the pressure sensor 26 activating the at least one emergency spring cylinder 8 when the at least one emergency spring cylinder 8 drops below a lower limit value.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A secondary suspension system for a rail vehicle comprising:
 a superstructure;
 a bogie arranged below the superstructure;
 a hydropneumatic spring unit located between the superstructure and the bogie and providing in a normal operation at least one raised traveling level for the superstructure and a lowered platform level for the superstructure lower than the at least one raised traveling level; and
 at least one emergency spring cylinder, wherein when the system fails, the at least one emergency spring cylinder moves into an emergency operation and provides an emergency spring level situated between the at least one raised traveling level and the lowered platform level.

2. The system according to claim 1, wherein when the system fails, the emergency spring level is adjusted by an automatic moving-out of the at least one emergency spring cylinder.

3. The system according to claim 1, wherein when the system fails, the emergency spring level is adjusted by an already moved-out emergency spring cylinder.

4. The system according to claim 1, wherein the at least one emergency spring cylinder comprises a hydraulic piston surrounded by a tension cylinder, the piston and tension cylinder configured to be movable relative to one another by a pressure spring.

5. The system according to claim 4, wherein the pressure spring is constructed of steel in the manner of a coil spring which coaxially surrounds the tension cylinder.

6. The system according to claim 1, wherein with respect to a flow of force, the at least one emergency spring cylinder is connected in parallel to the hydropneumatic spring unit.

7. The system according to claim 1, wherein the at least one emergency spring cylinder is arranged to be acting locally next to the hydropneumatic spring unit between the superstructure and the bogie.

8. The system according to claim 1, wherein the at least one emergency spring cylinder coaxially surrounds the hydropneumatic spring unit and is disengaged during the normal operation, and the at least one emergency spring cylinder is used in the emergency operation.

9. The system according to claim 1, wherein for the emergency operation, the hydropneumatic spring unit is vertically guided by a coaxial upper pin by a corresponding recess on a side of the superstructure to ensure the providing of the emergency spring level by the at least one emergency spring cylinder.

10. The system according to claim 1, wherein with respect to a flow of force, the at least one emergency spring cylinder is connected in series with respect to the hydropneumatic spring unit, so that the at least one emergency spring cylinder and the hydraulic spring unit act simultaneously to reach the lowered station platform level and an additional action upon a tension cylinder takes place to compress the pressure spring.

11. The system according to claim 1, wherein an automatic moving-out of the tension cylinder takes place as a result of a pressure drop in the at least one emergency spring cylinder.

12. The system according to claim 7, wherein in the normal operation, a piston of the at least one emergency spring cylinder is moved out in a disengaged manner, the hydropneumatic spring unit ensuring the at least one traveling level, and, after activating normally closed unlocking devices, the piston is at least partially lowered inside a cylinder housing surrounding it in order to reach the lowered station platform level, and in the event the system fails, the normally closed unlocking devices ensure a moved-out position of the piston, so that the emergency level is ensured by of the at least one emergency spring cylinder.

13. The system according to claim 12, wherein the piston comprises at least one piston sleeve configured to be telescopically displaced against a spring force.

14. The system according to claim 13, wherein the spring force is generated by a coaxial arrangement of an elastomer element surrounded by a pressure spring.

15. The system according to claim 7, wherein a piston is configured to be changed into the moved-out position by a pressure spring interacting with a cylinder housing, by at least one of the weight of the piston, and an admission of pressure medium to a pressure chamber of the cylinder housing.

16. The system according to claim 4, further including two hydraulic circuits, one hydraulic circuit supplying the hydropneumatic spring unit with a pressure medium and the other hydraulic circuit supplying the at least one emergency spring cylinder with a pressure medium.

17. The system according to claim 1, wherein the hydropneumatic spring unit comprises a pendulum support for transmitting transverse movements between the superstructure and the bogie.

18. The system according to claim 1, further including a level sensor for measuring a distance between the superstructure and the bogie, which level sensor, as an actual value generator, is a component of an active level control for adjusting a desired superstructure level.

19. The system according to claim 18, wherein the level sensor is simultaneously used for activating the at least one emergency spring cylinder.

20. The system according to claim 1, further including least one hydraulic circuit which comprises at least one hydraulic accumulator associated with the hydropneumatic spring unit.

21. The system according to claim 1, further including at least one hydraulic circuit having a pressure sensor inside, and an electronic analyzing system is connected on an output side of the pressure sensor activating the at least one emergency spring cylinder when the pressure in the at least one hydraulic circuit drops below a lower limit value.

22. The system of claim 1, wherein the hydropneumatic spring unit is an active spring element.

* * * * *